United States Patent [19]

Gött et al.

[11] 4,239,951
[45] Dec. 16, 1980

[54] MULTISPOT GRID-WELDING MACHINE

[75] Inventors: Hans Gött; Josef Ritter; Klaus Ritter; Gerhard Ritter, all of Graz, Austria

[73] Assignee: EVG Entwickoungs-Gesellschaft mbH, Graz, Austria

[21] Appl. No.: 4,228

[22] Filed: Jan. 17, 1979

[30] Foreign Application Priority Data

Jan. 20, 1978 [AT] Austria ................................. 436/78

[51] Int. Cl.³ ........................................... B23K 11/32
[52] U.S. Cl. ........................................ 219/56; 219/58
[58] Field of Search ........................ 214/56, 58, 88; 200/252, 18, 16 R

[56] References Cited

U.S. PATENT DOCUMENTS

| | | |
|---|---|---|
| 3,125,668 | 3/1964 | Eisenburger .................. 219/56 X |
| 3,469,055 | 9/1969 | Gott . |
| 3,588,417 | 6/1971 | Gott . |
| 3,676,632 | 7/1970 | Ritter . |
| 4,064,385 | 12/1977 | Gott .................................. 219/56 |

FOREIGN PATENT DOCUMENTS 1440397 11/1961 Fed. Rep. of Germany .

Primary Examiner—E. A. Goldberg
Attorney, Agent, or Firm—Ernest F. Marmorek

[57] ABSTRACT

A multispot mesh welding machine has a row of welding electrode holders (2) on one side of the working plane of the mesh (Q, L), each holder (2) being electrically connectable to a selected one of at least two busbars (11, 12, 13, 14) which extend across the machine transversely of the direction of advance of the mesh (Q, L), by a respective switching member (9) movable with respect to the electrode holder (2). Each of the elctrode holders (2) has a contact tongue (6) overlying the contact faces of the busbars (11, 12, 13, 14,) and the respective switching member (9) is positioned between the contact tongue (6) and the contact faces of the busbars (11, 12, 13, 14).

3 Claims, 4 Drawing Figures

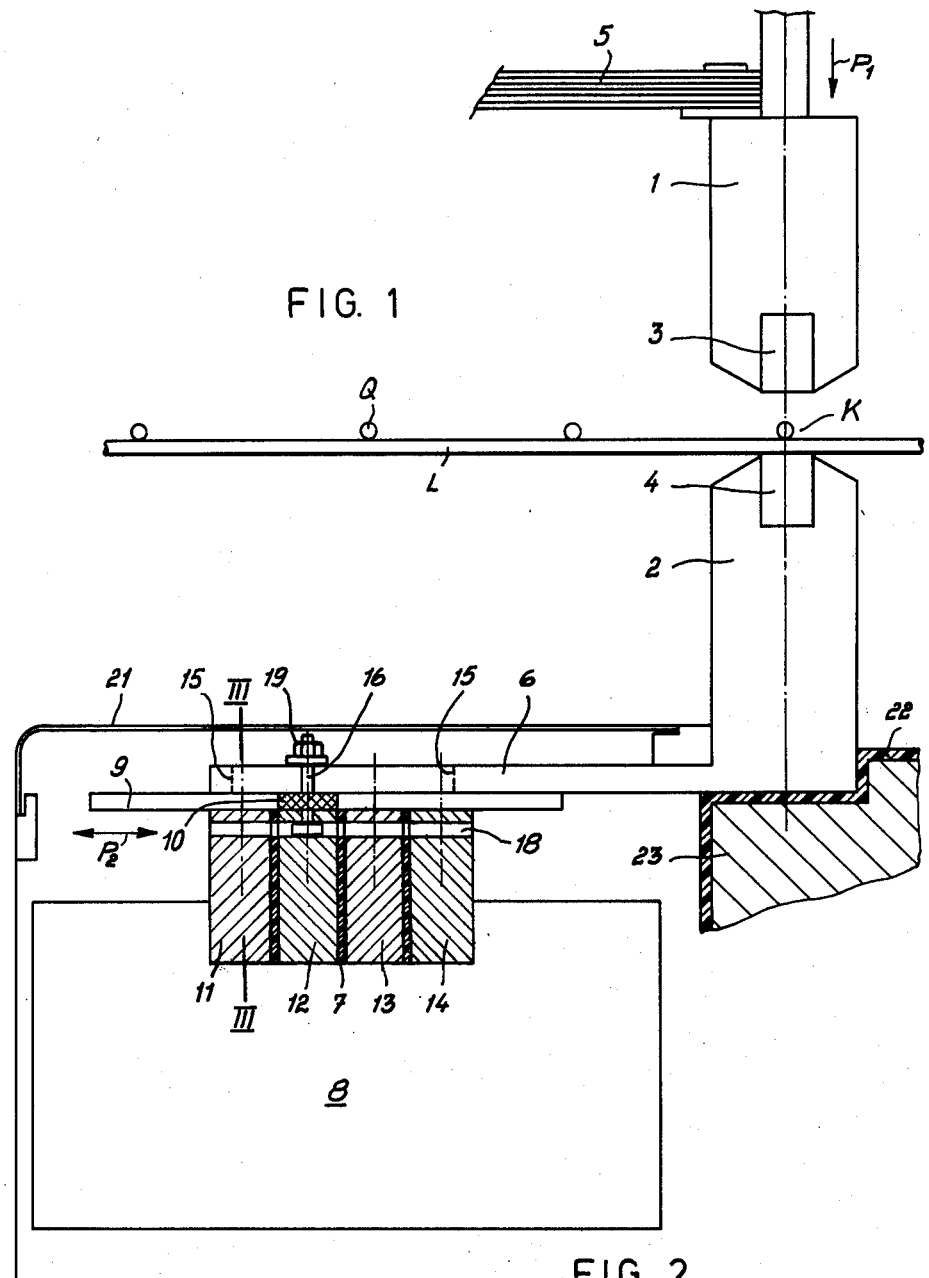
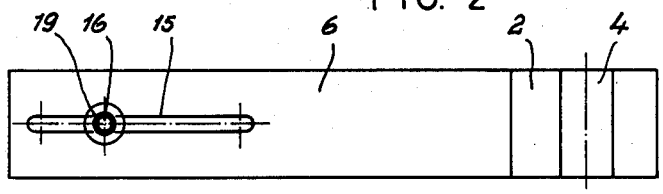

U.S. Patent Dec. 16, 1980 Sheet 2 of 2 4,239,951
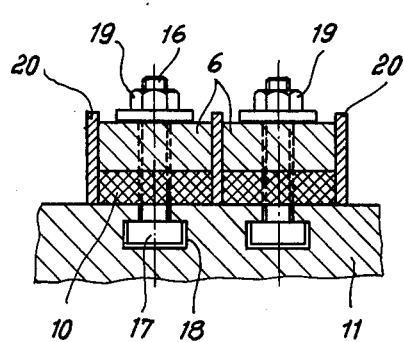
FIG. 3
FIG. 4
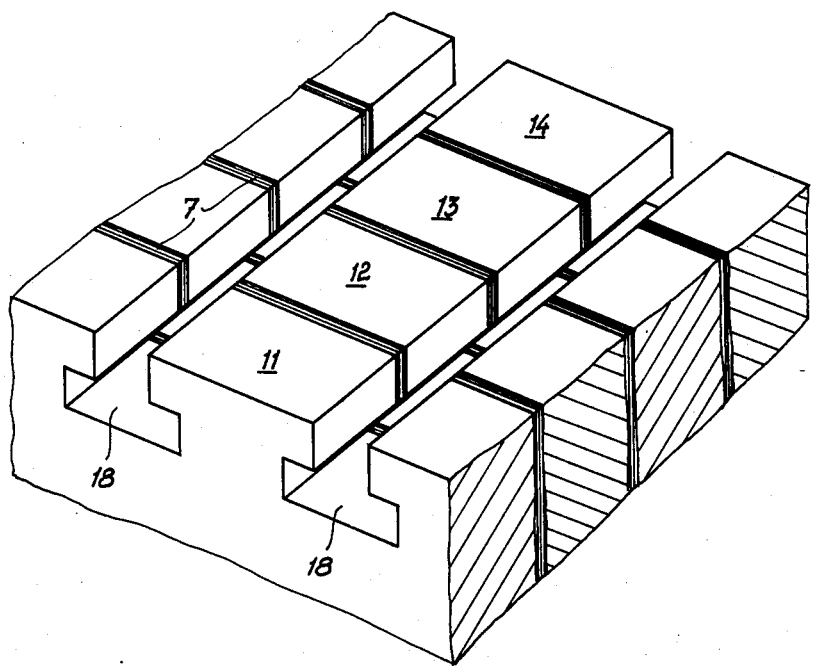

MULTISPOT GRID-WELDING MACHINE

The invention relates to a development of the welding machine forming the subject of our U.K. Pat. No. 1,472,145, for the feeding of current to the electrodes of a multispot grid-welding machine via a selectable one of at least two busbars. The device is particularly suitable for grid-welding machines having active electrodes and passive current bridges.

In U.K. Pat. No. 1,472,145 there is described a welding machine in which, on the side of the grid production plane next to the busbars each electrode holder is provided with an adjustable switch-member which, in different switching positions, connects different busbars to the electrode holder and which, in one switching position, separates all of the busbars from the electrode holder. Thus, by simple adjustments of the position of the switch-member alterations of the voltages effective at the electrodes, necessary when there is an alteration of the pitch of the longitudinal wires and/or of the diameters of the wires to be processed, can be achieved.

In the example illustrated in the specification of U.K. Pat. No. 1,472,145 the underface of each electrode holder is formed as a contact face parallel with horizontal contact faces on the busbars and between the two contact faces there is a, preferably rectangular, slider of electrically conductive material. On both contact faces of the slider insulating material is disposed, the insulating material on one side being mutually offset from that on the other. With this arrangement however the danger of soiling the parts of the contact faces of the busbars close to the electrodes, by weld spatter still exists.

In order to overcome this problem and in accordance with the invention a multispot mesh welding machine has a row of welding electrode holders on one side of the working plane of the mesh, each electrically connectable, to a selected one of at least two busbars which extend across the machine transversely of the direction of advance of the mesh, by a respective switching member movable with respect to the electrode holder, each of the electrode holders having a contact-tongue overlying the contact faces of the busbars, and the respective switching member being positioned between the contact tongue and the contact faces of the busbars.

In this way the busbars may be arranged at a distance from the electrode holders, preferably offset in the longitudinal direction of the machine with respect to the row of electrodes, and where necessary covered over, so that the contact faces are no longer exposed to weld spatter.

Advantageously each contact tongue has an elongate hole extending across the contact faces of the busbars, through which extends a bolt which passes through the conductive part of the switch-member and by means of which a selected one of the busbars, the conductive part of the switch-member and the contact tongue can be drawn together to make contact. T-shaped grooves may extend through the busbars below the contact tongues and in parallel with them, enlarged head parts of the bolts being anchored therein.

One example of a machine constructed in accordance with the invention will now be described with reference to the accompanying drawings in which:

FIG. 1 is a longitudinal section through the electrode region of a multispot grind-welding machine;

FIG. 2 is a plan of an electrode and its contact tongue;

FIG. 3 is a cross-section along the line III—III in FIG. 1; and,

FIG. 4 is a perspective view of the busbars.

In the embodiment shown, above and below the grid production plane in which the longitudinal and cross-wires L and Q respectively are welded together, there are rows of upper and lower electrode holders 1 and 2 running transversely to the direction of feed of the longitudinal wires L, each holder carrying an electrode 3 or 4 respectively. A flexible lead 5 connects each electrode holder to earth and each upper electrode 3 can be pressed by means (not shown) in the direction of the arrow $P_1$ towards the crossover point K of the wires which, at the time, lies in the welding position and towards the associated lower electrode 4, in order to apply the necessary welding pressure. The lower electrode holders 2 are provided with contact tongues 6 extending horizontally in the longitudinal direction of the welding machine. The tongues 6 overlap the contact faces of parallel busbars 11 to 14 running below the grid production plane transversely, across the width of the machine. The busbars are separated from one another by insulating intermediate layers 7 and are at different welding voltages. Advantageously the busbars are arranged above the welding transformers 8 from which they are fed.

Between each contact tongue 6 and the contact faces of the busbars 11 to 14 next to it there is arranged a strap-like switch-member 9 which consists mainly of insulating material, but which has a conductive part 10 the dimensions of which correspond approximately to the region of overlap between the contact tongue in question and one of the busbars. The switch-member 9 is adjustable in the direction of the double arrow $P_2$ so that a conductive connection can be produced from the associated contact tongue 6 to any one of the busbars 11 to 14.

As may be seen particularly clearly from FIG. 2, each contact tongue 6 has an elongate hole 15 extending across the contact faces of all the busbars 11 to 14, and in which is guided a bolt 16 serving to fix the switch-member 9 in the desired position. The bolt 16 passes through the conductive part 10 of the switch-member 9 and has an enlarged head 17 which engages in an associated T-shaped groove 18. A number of such grooves 18 are provided parallel with one another and these pass through all of the busbars and are open upwards. The distances apart of the T-shaped grooves 18 corresponds with the smallest spacing of the longitudinal wires of the types of grid to be produced by the welding machine. The bolts 16 may be tightened firmly and the switch-members 9 fixed in the desired position by means of nuts 19 resting against associated washers.

A further advantage of this construction lies in the fact that the desired contact pressure may be chosen freely by appropriate tightening of the nuts 19 on the bolts and will remain completely unaffected by the action of pressure on the electrodes which occurs during the welding process.

Adjacent electrode holders 2 and the associated contact tongues 6, if they are only a small distance apart, may be separated from one another by insulating layers 20, as may be seen in FIG. 3.

The contact tongues 6 and the busbars 11 to 14 are protected on the top against weld spatter by a cover 21. Preferably, (as illustrated in FIG. 1) the busbars are arranged offset with respect to the rows of electrodes in the longitudinal direction of the machine, in which case the lower electrode holders 2 are supported against the welding pressure by a crossbeam 23. An insulating layer 22 is interposed between the electrode holders 2 and the crossbeam 23. Alternatively the busbars may be arranged below the electrode holders 2 in such a way that their contact faces are aligned vertically, in which case the contact tongues 6 extend downwardly from the electrode holders 2. Instead of T-shaped grooves, drilled and tapped holes could be provided in the contact faces of the busbars also at spacings corresponding with the smallest required pitch of the longitudinal wires and a bolt passing through the conductive part of the switchmember and the elongate hole in the contact tongue could be screwed into the tapped hole in the required busbar in order to provide a suitable connection between the contact tongue and the busbar in question.

We claim:

1. In a multispot mesh welding machine having a welding zone and defining a working plane of the mesh and having a plurality of busbars extending across said machine transversely to the working plane, said mesh welding machine further comprising a row of electrode holders on one side of said working plane of said mesh, each of said electrode holders having a supporting surface and being adapted to be in operative connection with an adjustable switching device movable with respect to a corresponding electrode holder, said switching device being adapted to connect said electrode holder to a selected one of said busbars or to disconnect said electrode holder from all of said busbars, the contact surfaces of said busbars and the supporting surfaces of said electrode holders being arranged in staggered relation with respect to one another, each of said electrode holders being provided with a contact tongue, said contact tongue protruding beyond the welding zone and extending across the contact surfaces of all of said busbars and being operatively connected to said adjustable switching member, said switching member being located between said contact tongue and the contact surfaces of said busbars.

2. In a multispot mesh welding machine according to claim 1 said switching member having an electrically conductive part, the contact tongue having an elongate slot, said slot receiving a threaded bolt which passes through the electrically conductive part of the switching member, said bolt being adapted to conductively tie together the contact surface of one of said busbars, the electrically conductive part of said switching member and said contact tongue.

3. In a machine according to claim 2, the busbars being provided with T-shaped grooves extending thereacross, said grooves being adapted to receive the enlarged head parts of said threaded bolts.

* * * * *